(12) United States Patent
Yu et al.

(10) Patent No.: US 10,572,275 B2
(45) Date of Patent: Feb. 25, 2020

(54) COMPATIBLE DICTIONARY LAYOUT

(71) Applicant: MICROSOFT TECHNOLOGY LICENSING, LLC, Redmond, WA (US)

(72) Inventors: Hongtao Yu, Bothell, WA (US); David Charles Wrighton, Redmond, WA (US); Ian Michael Bearman, Seattle, WA (US); Michal Strehovský, Seattle, WA (US); Peter Franz Valentin Sollich, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/623,667

(22) Filed: Jun. 15, 2017

(65) Prior Publication Data
US 2018/0365033 A1    Dec. 20, 2018

(51) Int. Cl.
*G06F 9/445* (2018.01)
*G06F 8/70* (2018.01)

(52) U.S. Cl.
CPC ............ *G06F 9/44536* (2013.01); *G06F 8/70* (2013.01)

(58) Field of Classification Search
CPC .............. G06F 8/70–71; G06F 9/44521; G06F 9/44505–44536
See application file for complete search history.

(56) References Cited

U.S. PATENT DOCUMENTS

| | | | | |
|---|---|---|---|---|
| 4,456,973 A * | 6/1984 | Carlgren | ............. | G06F 17/2795 704/1 |
| 5,280,617 A * | 1/1994 | Brender | .................. | G06F 8/447 717/159 |
| 5,327,562 A * | 7/1994 | Adcock | .................... | G06F 9/449 717/141 |
| 5,408,665 A * | 4/1995 | Fitzgerald | ............... | G06F 8/433 707/999.01 |

(Continued)

OTHER PUBLICATIONS

Ponomarenko et al., Automated Verification of Shared Libraries for Backward Binary Compatibility, published by IEEE pp. 57-62 (Year: 2010).*

(Continued)

*Primary Examiner* — Thuy Dao
*Assistant Examiner* — Zheng Wei
(74) *Attorney, Agent, or Firm* — Rainier Patents, P.S.

(57) ABSTRACT

Compatibility can be maintained when program code and pre-computed data associated with the program code are distributed in separate modules by using a data structure of key/value pairs comprising a dictionary. The dictionary can include a fixed part, a floating part and a version number. The version number in the dictionary can be used to determine if a dictionary for the program is current or outdated by comparing the dictionary version number and the version number associated with a dictionary layout in the current shared library. The dictionary can be rebuilt dynamically if the version number of the dictionary does not match the version number of the dictionary layout in the current shared library. The version number of the dictionary can be updated (Continued)

to the version associated with the layout version and the version pointer in the dictionary can be updated to point to the updated version number.

13 Claims, 5 Drawing Sheets

(56) References Cited

U.S. PATENT DOCUMENTS

| | | | | |
|---|---|---|---|---|
| 5,634,114 | A * | 5/1997 | Shipley | G06F 8/71 717/170 |
| 5,845,118 | A * | 12/1998 | Gheith | G06F 8/443 717/158 |
| 5,907,707 | A * | 5/1999 | Ramalingam | G06F 9/449 717/104 |
| 5,970,252 | A * | 10/1999 | Buxton | G06F 9/4488 717/166 |
| 6,202,205 | B1 * | 3/2001 | Saboff | G06F 8/443 717/151 |
| 6,311,227 | B1 * | 10/2001 | Tabuchi | G06F 9/4486 719/316 |
| 6,314,559 | B1 * | 11/2001 | Sollich | G06F 8/33 717/111 |
| 7,080,370 | B1 * | 7/2006 | Crowl | G06F 8/41 717/163 |
| 7,752,596 | B2 | 7/2010 | Wyganowski et al. | |
| 8,015,450 | B1 * | 9/2011 | Cooley | G06F 8/61 714/38.1 |
| 8,370,818 | B2 * | 2/2013 | Osminer | G06F 9/44589 717/140 |
| 8,473,927 | B2 * | 6/2013 | Li | G06F 11/3604 717/131 |
| 8,595,715 | B2 * | 11/2013 | Ward | G06F 8/71 717/168 |
| 9,104,504 | B2 * | 8/2015 | Chow | G06F 8/54 |
| 9,274,772 | B2 | 3/2016 | Sollich | |
| 9,280,338 | B1 * | 3/2016 | Stickle | G06F 9/44536 |
| 9,836,290 | B2 * | 12/2017 | Strehovsky | G06F 8/4434 |
| 2003/0191870 | A1 * | 10/2003 | Duggan | G06F 9/541 719/331 |
| 2005/0039196 | A1 * | 2/2005 | Sasidharan | G06F 8/65 719/331 |
| 2005/0049790 | A1 * | 3/2005 | Holman | G06F 8/61 702/3 |
| 2005/0131870 | A1 * | 6/2005 | Krishnaswamy | G06F 8/71 |
| 2005/0177826 | A1 * | 8/2005 | Miller | G06F 9/44536 717/170 |
| 2005/0262522 | A1 * | 11/2005 | Gassoway | G06F 9/4484 719/331 |
| 2006/0095897 | A1 * | 5/2006 | Kawai | G06F 8/433 717/140 |
| 2006/0161910 | A1 * | 7/2006 | Bonsteel | G06F 9/44521 717/170 |
| 2006/0236315 | A1 * | 10/2006 | Bracha | G06F 8/315 717/168 |
| 2006/0271922 | A1 * | 11/2006 | Chan | G06F 9/445 717/166 |
| 2007/0180442 | A1 * | 8/2007 | Oi | G06F 9/445 717/166 |
| 2008/0010649 | A1 * | 1/2008 | Grimaud | G06F 9/445 719/332 |
| 2008/0022266 | A1 * | 1/2008 | Hudson | G06F 8/44 717/140 |
| 2008/0127142 | A1 * | 5/2008 | Wrighton | G06F 9/45516 717/148 |
| 2008/0127303 | A1 * | 5/2008 | Wrighton | G06F 8/315 726/2 |
| 2009/0037933 | A1 * | 2/2009 | Chandran | G06F 9/4486 719/315 |
| 2009/0083295 | A1 * | 3/2009 | Minamino | G06F 16/289 |
| 2009/0112575 | A1 * | 4/2009 | Sakashita | G06F 17/2827 704/8 |
| 2009/0328026 | A1 * | 12/2009 | Yamashita | G06F 8/65 717/170 |
| 2010/0017503 | A1 * | 1/2010 | Kim | G06F 8/71 709/219 |
| 2011/0055814 | A1 * | 3/2011 | Klarer | G06F 8/443 717/124 |
| 2011/0083129 | A1 * | 4/2011 | Masaki | G06F 8/65 717/175 |
| 2011/0258615 | A1 | 10/2011 | Sollich | |
| 2011/0258616 | A1 * | 10/2011 | Sollich | G06F 9/44 717/146 |
| 2011/0265071 | A1 * | 10/2011 | He | G06F 9/44536 717/168 |
| 2011/0302574 | A1 * | 12/2011 | Yoshikawa | G06F 8/65 717/173 |
| 2012/0131538 | A1 * | 5/2012 | Das | G06F 8/70 717/100 |
| 2012/0167068 | A1 * | 6/2012 | Lin | G06F 8/4434 717/160 |
| 2012/0304162 | A1 * | 11/2012 | Yamauchi | G06F 8/65 717/170 |
| 2013/0191738 | A1 * | 7/2013 | Bank | G06F 17/2276 715/259 |
| 2014/0059525 | A1 * | 2/2014 | Jawa | G06F 21/53 717/162 |
| 2014/0282457 | A1 * | 9/2014 | Chow | G06F 8/54 717/164 |
| 2014/0317641 | A1 * | 10/2014 | Trofin | G06F 9/448 719/328 |
| 2015/0082298 | A1 * | 3/2015 | Wang | G06F 8/60 717/174 |
| 2015/0268948 | A1 * | 9/2015 | Plate | G06F 8/71 717/123 |
| 2015/0277881 | A1 * | 10/2015 | Strehovsky | G06F 8/49 717/154 |
| 2015/0277899 | A1 * | 10/2015 | Hamby | G06F 8/41 717/120 |
| 2015/0301807 | A1 | 10/2015 | Goetz et al. | |
| 2016/0019037 | A1 * | 1/2016 | Varga | G06F 8/443 717/151 |
| 2016/0202961 | A1 | 7/2016 | Goetz et al. | |
| 2017/0075686 | A1 * | 3/2017 | Ko | G06F 9/06 |
| 2017/0147337 | A1 * | 5/2017 | Hamby | G06F 8/73 |
| 2018/0217851 | A1 * | 8/2018 | Sirajuddin | G06F 9/44521 |

OTHER PUBLICATIONS

Oliveira et al., Generics as a Library, published by Seventh Symposium on Trends in Functional Programming 2006, pp. 1-15 (Year: 2006).*

Colombo, Carlo, ".NET Generics and Code Bloat (or its lack thereof)", https://blogs.msdn.microsoft.com/carlos/2009/11/09/net-generics-and-code-bloat-or-its-lack-thereof/, Published on: Nov. 9, 2009, 22 pages.

Sulzmann, et al., "Modular Generic Programming with Extensible Superclasses", In Proceedings of the ACM SIGPLAN workshop on Generic programming, Sep. 16, 2006, pp. 1-11.

* cited by examiner

COMPATIBLE DICTIONARY LAYOUT

BACKGROUND

As used in the world of computing, a "library" is a collection of program resources. A resource in a library is also referred to as a "library". The value of a library lies in its ability to be re-used. Resources in the library can be used by multiple independent programs or sub-programs. The resources in the library can include already written code, subroutines, classes, type specifications and so on. If the code of the library is accessed during compilation of the invoking program, the library is called a static library. Alternatively, the executable of the invoking program can be distributed independently of the library. A dynamic library is loaded and linked at runtime. Alternatively, during execution, an application may explicitly request to load a particular library resource.

When a library resource is distributed independently of the executable of the program that invokes the library resource, incompatibilities can arise.

SUMMARY

Compatibility can be maintained when program code and pre-computed data associated with the program code are distributed in separate modules by using a data structure of key/value pairs. A dictionary of key/value pairs can map a series of keys to a series of values. Keys can be implicit in the layout of the dictionary so that the dictionary data structure itself includes the values and does not necessarily include the keys. The dictionary can be created as a product (artifact) of compilation. When code is generated during compilation, the code can be generated having an awareness of the dictionary layout, enabling the code to access values in the dictionary in a more efficient manner. The program code may determine the content of the dictionary, so that when the code changes the content of the dictionary may also change. The program code may determine the layout of the dictionary, so that when the code changes the layout of the dictionary may also change. The dictionary can be a store of information that enables general purpose code to behave in a specialized fashion depending on information provided to the compiler when the general purpose code is compiled.

The dictionary layout described herein, referred to as a hybrid dictionary layout can be utilized to achieve dictionary stability and therefore library compatibility. A hybrid dictionary layout can include a fixed part, a floating part and a version number. In the fixed part of the dictionary for a particular program, entries are in a fixed order and do not change from compilation to compilation of the program. An entry in the dictionary for the program can be accessed using an offset from the beginning of the dictionary where the offset for that entry does not change from compilation to compilation of the program. In the floating part of the dictionary, the number of entries can increase or decrease. Entries may not be in order. An entry can be referenced by a symbol relocation. If, for example, the dictionary does not include location information for a dependency, a dynamic type loader can be invoked to get the information needed to access the information that is not in the dictionary for the program.

The version number in the dictionary for the program can be used to determine if a dictionary for the program is current or outdated. A dictionary layout that is associated with a current shared library is current. A corresponding dictionary of a consuming program may be outdated if the consuming program was compiled using an outdated version of the shared library. The version number can be used to determine if a floating part entry is present or if the floating part will be regenerated (e.g., by a helper function, etc.). The fixed part of the dictionary of the program can be pre-computed by a scanning pass in a compiler. Dictionary entries that are commonly used can be identified and these entries can be placed in the fixed part. The code generator may issue a constant offset for a commonly used entry. This can be done without considering code quality and/or code size.

The floating part of the dictionary for a program may vary from compilation to compilation. The floating part of the dictionary for a program can provide a view of optimization-introduced entries. The code generator can use symbol relocations which are "fixed up" (changed from a placeholder) by the compiler very late in compilation. The compiler can assign a location of the entry to be a multiple of a standard offset from the beginning of the dictionary. For example, an offset can be some multiple of 32 bits from the beginning of the dictionary. The offset can be used to access the entry. In this approach, code quality may be favored at the expense of code size.

The version number can be computed based on a comparison of a dictionary version number and the version number associated with a dictionary layout in the current shared library. Any difference between an outdated dictionary and a current dictionary layout can result in a new version number being assigned to the dictionary. A specified number, (e.g., −1), can be used to indicate that the current dictionary layout is not compatible with any other version of the dictionary. In this case, a dynamic type loader can be called to rebuild the floating part of the dictionary the first time the floating part is accessed. A pointer in the fixed part of the dictionary for a program can point to the version number of the dictionary for the program. The floating part of the dictionary can be rebuilt dynamically if the version number of the dictionary does not match the version number of the dictionary layout in the current shared library. The version number can be followed by the floating part of dictionary for the program. The floating part of the dictionary for the program can be rebuilt dynamically (while the program is executing) if the version of the dictionary for the consuming program does not match the version of the dictionary layout for the called program in the shared library. Once the floating part is rebuilt, the version number of the dictionary can be updated to the version associated with the layout version and the version pointer in the dictionary can be updated to point to the updated version number.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
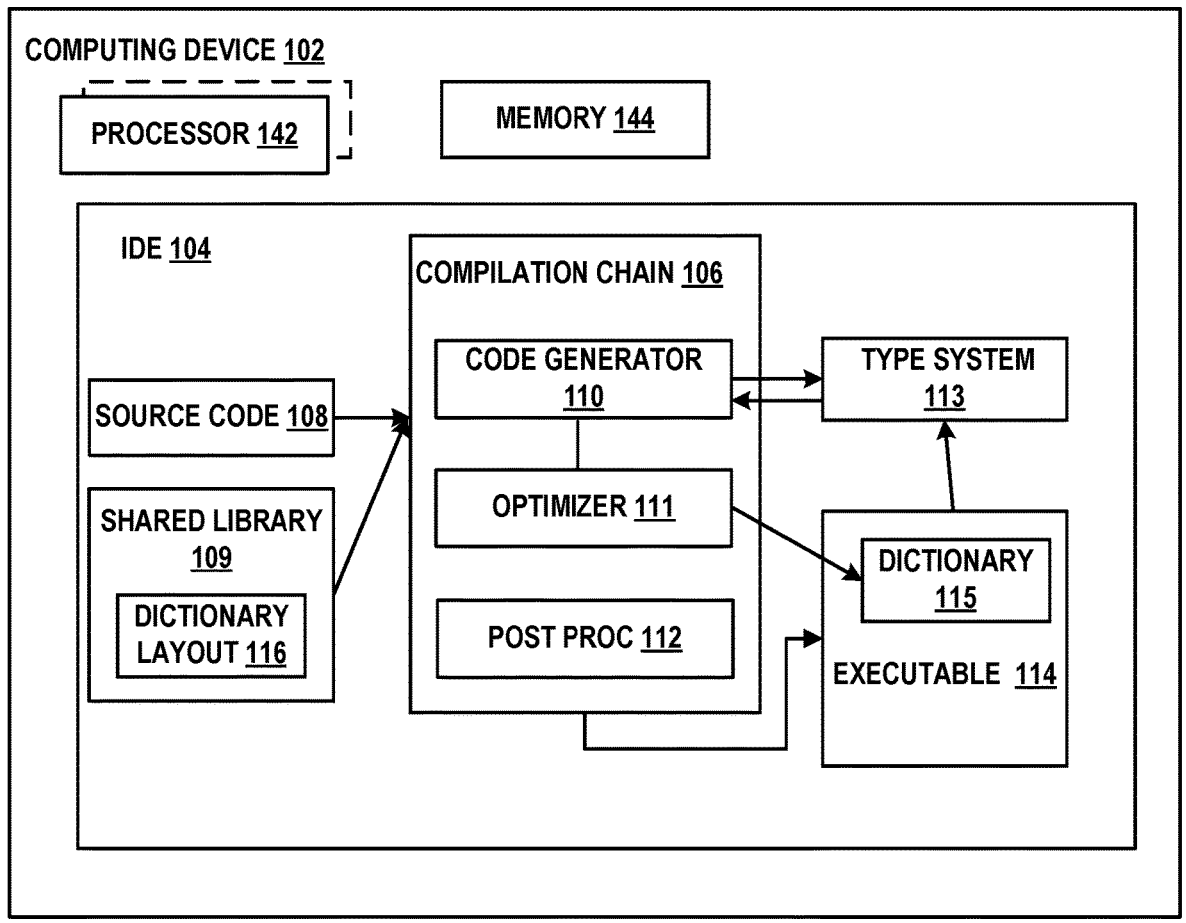
FIG. 1a is a block diagram 100 representing an example of a compile time system using a hybrid dictionary in accordance with aspects of the subject matter described herein.

When source code is compiled, a set of dependencies for the code is computed. A dependency is a library resource needed by the program when it runs. The particular set of dependencies needed by a program can be computed based on the input source code and the tools (e.g., the compiler chain) that generate the output of the compiler.

A dictionary as disclosed herein can be a collection of type system constructs that can be used in the context of shared generic code. The contents of the dictionary are dependent on the particular set of dependencies computed for the program. Incompatibilities between the dictionary associated with a program and the dictionary layout associated with a shared library can arise because of multiprocessing, because the program is optimized or is not optimized, because the compiler has changed or because the source code has changed. The subject matter disclosed herein enables an executable produced with an outdated shared library to be successfully run even if the shared library has been updated to a more current version.

For example, suppose a shared library is generated on Jan. 1, 2016. Suppose further that an application is compiled on Mar. 1, 2016, the application being compiled using the shared library generated on Jan. 1, 2016. Suppose further that the shared library generated on Jan. 1, 2016 includes a dictionary layout L1 for dictionary D. Suppose the application generated on Mar. 1, 2016 includes an executable E that includes dictionary D having a layout L1. Suppose the application including executable E is provided to a user U. Now suppose the shared library is updated and recompiled on Jun. 1, 2016, changing the layout of dictionary D to layout L2. Suppose the updated shared library is distributed to user U. Because the dictionary layout of the shared library has changed from L1 to L2, it is very likely that executable E will no longer execute and/or execute correctly. However, in accordance with aspects of the subject matter disclosed herein, instead of failing to execute and/or execute correctly, the dictionary D can be updated to layout L2 and the executable can execute and execute correctly.

When a multi-threaded compiler compiles source code, entries in the dictionary are produced by the code generator in a random order as an artifact of multi-processing. That is, one compilation may result in a dictionary that differs from another compilation of the same source code by the same compiler because of the particular environmental conditions present at the time at which multi-threaded processing takes place. For example, one multi-threaded compilation of source code A may result in a dictionary that includes entries in the order method A, method B, method C while another compilation of source code A by the same compiler may result in a dictionary that includes entries in the order method B, method C, method A.

In accordance with aspects of the subject matter described herein, a hybrid dictionary can stabilize the order of the entries in the dictionary by pre-examining the methods used by the program and generating a dictionary that orders the entries in a specified way based on the source code. This order can be maintained even if the compiler is changed (e.g., a different version of the compiler is used). One way the order of the entries can be maintained is by determining the dependencies of the source code, sorting the dependencies and placing entries in the dictionary in the order of the sorted dependencies. During code generation, in accordance with aspects of the subject matter described herein, an index into the dictionary is computed. Because the index information may be unknown at the time of compilation, a placeholder may be inserted into the code. The placeholder index can be "fixed up" (replaced with the actual index values) later in the compilation process.

Differences between the dictionary associated with an un-optimized program and the same program that is compiled in optimization mode are likely to occur. If a program compilation is optimized, the code generator may remove some entries in the dictionary that was created before the optimization layer executed and may add others, causing differences between the dictionary created for the source code compiled in optimization mode and the dictionary created for the same source code compiled in non-optimization mode. For example, the source code can reference a shared library resource that calls a function. In an un-optimized compilation, a function call instruction is typically injected into the code. Nothing is needed in the dictionary to make the function call work. An optimization of the code may inline the function into the source code Inlining replaces the function call with the code of the function, copying the source code from the target function into the program code being compiled. One or more of the source code lines may have a dependency that requires one or more entries to be entered into the dictionary. In accordance with some aspects of the subject matter described herein, these entries are placed in the floating part of the dictionary.

Changes to the optimization layer of the compiler can result in differences in the dictionary associated with the optimized program. For example, a first optimized compiler may include dependencies A, B and C while a second optimized compiler may include dependencies A, B, C and D.

When a program is compiled, a set of dependencies (resources the program needs) are determined. If the source code for the program is altered, the set of dependencies for the compiled program can change. Even minor changes to the source code can impact the dictionary associated with the program. For example, suppose the source code is changed from gathering type information about a type T to capturing the size of type T. The content of the dictionary will be different. How the program is used can affect the content of the dictionary with which the program is associated.

For the fixed part of the dictionary, the index into the dictionary for a dependency can be pre-computed and therefore known. The pre-computed value for the index can be inserted into the code. For the floating part of the dictionary, the index into the dictionary for a dependency is unknown during code generation. The index for the dependency can be determined after compilation. The indices for dependencies can be determining by generating code that has an empty space in it and replacing the empty space with the index offset when the index offset is determined. This is called a symbol relocation. The index may not be available post-compilation because the index is created from an external module. A hypercall can be used to obtain an index from an external module. A hypercall is a call to a hypervisor or virtual machine supervisor.

Version number comparison logic can be injected into code that is used to rebuild the floating part of the dictionary. At runtime, version numbers between a dictionary of an executable and the dictionary layout of a shared library can be compared for compatibility. If the versions are not compatible, the floating part of the dictionary can be rebuilt. The execution environment can recreate the dictionary by dynamically rebuilding the dictionary. The version number of the dictionary of the executable can be changed so that the next time the program executes, the dictionary is not rebuilt again.

It will be appreciated that the subject matter disclosed herein can apply to any code for which dependencies are determined at compile time which could be determined at runtime. Moreover, the subject matter disclosed herein can apply to any code that has dynamic dependencies (dependencies that are only known at runtime). The subject matter disclosed herein can also apply to virtual function resolution using v-tables as in dynamic dispatch or polymorphism to enable changing the set of base types without invalidating pre-created v-tables. The subject matter disclosed herein can also apply when a regular expression is expressed as a finite state machine based on a string representing the regular expression. When the finite state machine for an expression is pre-computed at compile time and a data structure representing the expression is created, a version number can be associated with the data structure. At runtime the version number of the data structure can be compared with a version number of the data structure in the shared library. If the versions are not compatible, a new finite state machine can be produced from the string at runtime.

Compatible Dictionary Layout

FIG. 1a is a block diagram representing a compile time system 100 for generating a hybrid dictionary layout in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 may execute wholly or partially within an IDE such as IDE 104 or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include any one of or any combination of program modules comprising: a compilation chain such as compilation chain 106, and/or a type system such as type system 113. Compilation chain 106 can include a code generator such as code generator 110 and an optimizer such as optimizer 111. Compilation chain 106 may receive source code such as source code 108 and a shared library such as shared library 109. Code generator 110 can receive IR, an intermediate representation of source code (not shown) and can generate IR. The generated IR can be received by optimizer 111 which can generate IR (not shown), eventually leading to executable 114. Alternatively, the compilation can be unoptimized. The code generator 110 can access the type system 113 to determine an index into a dictionary such as dictionary 115 to be placed into code generated code. Optimizer 111 can add or remove entries in dictionary 115. Executable 114 may include one or more dictionaries such as dictionary 115, etc. Dictionary 115 can be a dictionary having a particular layout and version of the dictionary layout 116 of shared library 109.

One type of environment in which the subject matter described above is particularly helpful is for shared generic code. Shared generic code shares code among different instantiations of a single generic definition. It can apply to a non-generic method of a generic type or to a generic method. Generally, a method of a type instantiation over a reference type or a method instantiation over a reference type can be implemented by a particular instantiation over a particular shared generics type. The shared generics type instantiation can be used to replace a reference type in an instantiation of the program.

Because the type is unknown, the code generator can emit code to ask for the appropriate helper code and the type pointer from a generic dictionary of the type instantiation. The generic dictionary can be passed as an argument at each call of generics type method. A shared method can take an additional parameter known as the generic dictionary. A generic dictionary can be used to resolve the uses of the type arguments that come with the generic instantiation. Compile-time known arguments can be resolved to real symbols on the output image by the compiler. Shared generics arguments are runtime determined types which are compile-time unknown, so their usage can be resolved dynamically by calling runtime helpers or by looking up the generic dictionary or dictionaries associated with the context method.

Information that cannot be obtained directly from a location on the image can be acquired from a generic dictionary. Each instantiation has its own dictionary. Each generic type instantiation has its own generic dictionary. Non-generic methods of a type instantiation share the containing type's generic dictionary. A generic method instantiation has its exclusive dictionary.

A dictionary lookup is a compile-time action that can behave like a function taking a type handle or a method handle as an input and outputting a pointer to the information in question. A lookup happens between the code generator and the type system. A generic dictionary can be a table of pointers and integers. The type system can receive a lookup from the code generator and can return the index to the requested entry of the generic dictionary. The code generator can receive the index and can generates code to get the pointer out of the dictionary entry.

The layout of the dictionary refers to the ordering of lookups in the dictionary. Dictionaries of instantiations that share the same implementation have the same layout. A fixed dictionary layout of a shared instantiation can simplify the code generation of lookups. It also allows for the best code quality. Without a fixed layout and with the requirement of shared lookup code working for all instantiations, a conditional null check has to be done for every lookup and a runtime helper maybe called but only once, which is computationally more work. A fixed layout can result in larger code size in optimization mode.

The hybrid dictionary can be a consecutive memory block having the following layout:

|ptr to version|fixed slots|version|floating slots|

As described above a dictionary layout which includes all possible lookups can be computed before actual code generation. This can be achieved by emulating a conservative code generation to summarize all possible uses of generic dictionaries. Certain optimizations including inlining can be disabled. As previously described, a generic lookup from the compiler point of view is conceptually a function of runtime determined types/methods. A generic lookup can be represented by 1. a specific compiler intrinsic on a runtime determined type/method on the IL; and
2. a specific generic dictionary entry type with a runtime determined type/method Code generation optimizations such as but not limited to inlining can introduce new generic lookups which cannot be effectively predicted by the scanning pass. To allow those optimizations, the type system can receive new lookups from the code generator randomly and return a unique symbol for each random lookup which refers to the position of the lookup in its dictionary layout. The code generator can then issue a special relocation and later fix it up to a constant offset.

Figure 1B:
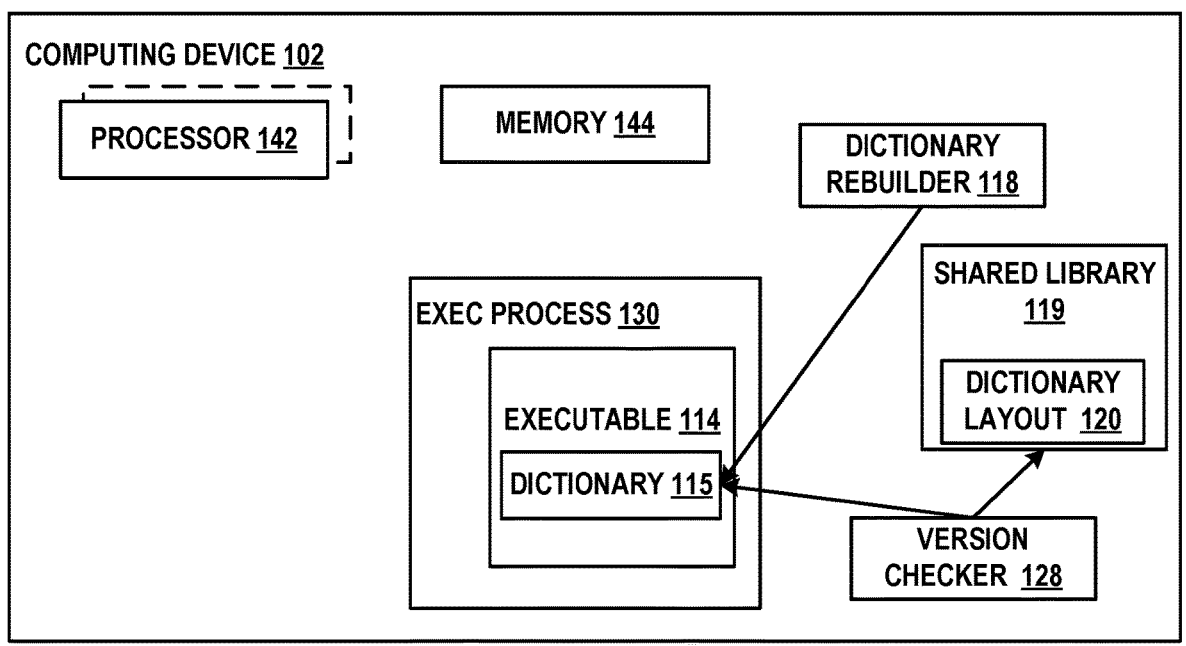
FIG. 1b is a block diagram 101 representing an example of a runtime system for using a hybrid dictionary in accordance with aspects of the subject matter described herein.

FIG. 1b is a block diagram representing an execution environment using a hybrid dictionary in accordance with aspects of the subject matter described herein. All or portions of system 101 may reside on one or more computers or computing devices such as the computers described below with respect to FIG. 3. System 101 or portions thereof may be provided as a stand-alone system or as a plug-in or add-in. System 101 may execute wholly or partially within an IDE or can execute wholly or partially outside an IDE. An IDE can be an IDE such as the one described with respect to FIG. 4 or can be any other IDE. All or portions of system 101 may be implemented as a plug-in or add-on.

System 101 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 101 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 101 may include any one of or any combination of program modules comprising one or more of: a version checker such as version checker 128, and/or a dictionary rebuilder such as dictionary rebuilder 118. In operation executable code such as executable code 114 and can be loaded into a process 130.

A version checker such as version checker 128 can execute to determine if the dictionary 115 in the executable is compatible with the layout 120 in the shared library 119. If the versions are compatible, the dictionary 115 in the executable 114 can be used. If the versions are not compatible, the dictionary 115 can be rebuilt from the layout 120 in the shared library 119 by the dictionary rebuilder 118. The rebuilt dictionary can be assigned an updated version number by the version checker 128 or by another program module separate from the version checker 128 (not shown).

Figure 2A:
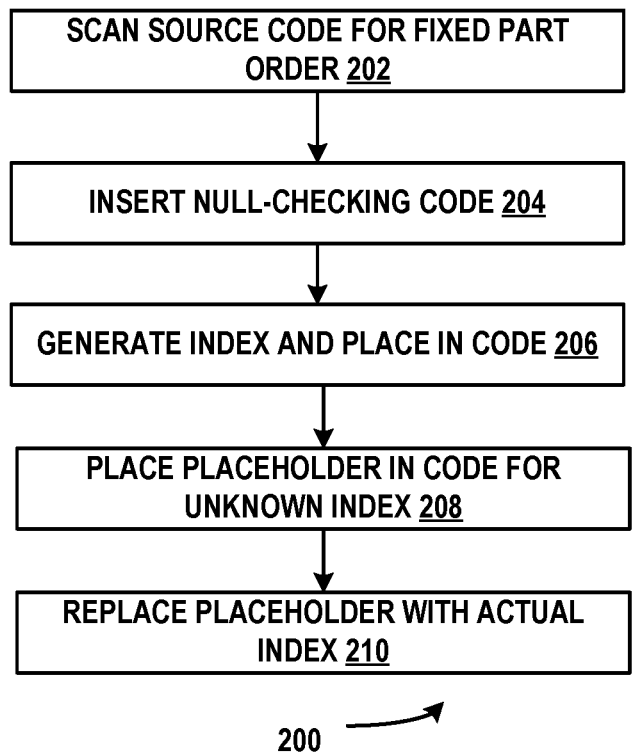
FIG. 2a illustrates an example 200 of a compile time method using a hybrid dictionary in accordance with aspects of the subject matter described herein.

FIG. 2a illustrates an example of a compile-time method 200 for using a hybrid dictionary in accordance with aspects of the subject matter described herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100 and/or system 101.

Figure 2B:
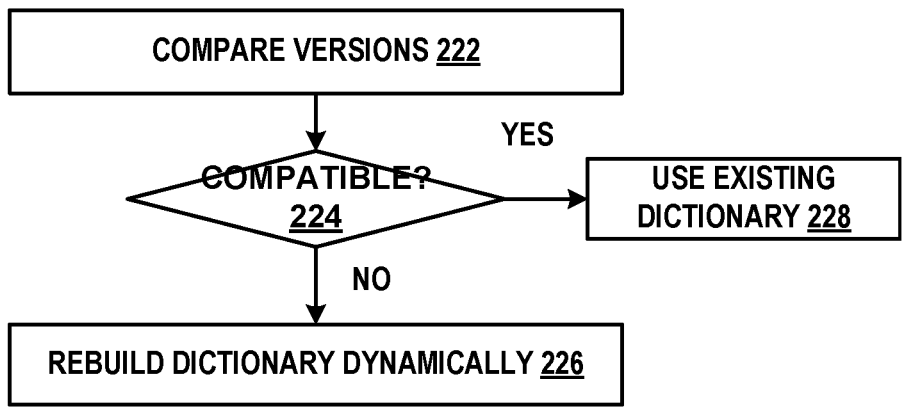
FIG. 2b illustrates an example 220 of a runtime method using a hybrid dictionary in accordance with aspects of the subject matter described herein.

At operation 202 source code can be scanned to generate an order for a fixed portion of a hybrid dictionary. The source code can be pre-examined and a portion of a dictionary that orders the entries in a specified way based on the source code can be generated. This order can be maintained even if the compiler is changed (e.g., a different version of the compiler is used). One way the order of the entries can be maintained is by determining the dependencies of the source code, sorting the dependencies and placing entries in the dictionary in the order of the sorted dependencies. At operation 204 null checking code can be inserted into the source code. At operation 206 during code generation, in accordance with aspects of the subject matter described herein, an index into the dictionary can be computed. The computed index can be placed into the code. Because the index information may be unknown at the time of compilation, at operation 208 a placeholder may be inserted into the code. The placeholder index can be "fixed up" (replaced with the actual index values) later in the compilation process at operation 210. A version number can be assigned to the dictionary. A version number can be the version of the corresponding dictionary layout of the shared library FIG. 2b illustrates an example of a runtime method 220 using a hybrid dictionary in accordance with aspects of the subject matter described herein. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated. Method 220 or portions thereof may be executed by a system or a portion of a system such as system 100 and/or system 101. At operation 222 the version of the program is compared with a version of the dictionary. At operation 224 the versions are determined to be compatible or not compatible. If the versions are not compatible, at operation 226 the dictionary is dynamically rebuilt. The version number of the dictionary is changed to be compatible with the version number of the program. At operation 228 if the versions are compatible, the existing dictionary in the shared library is used.

Example of a Suitable Computing Environment

Figure 3:
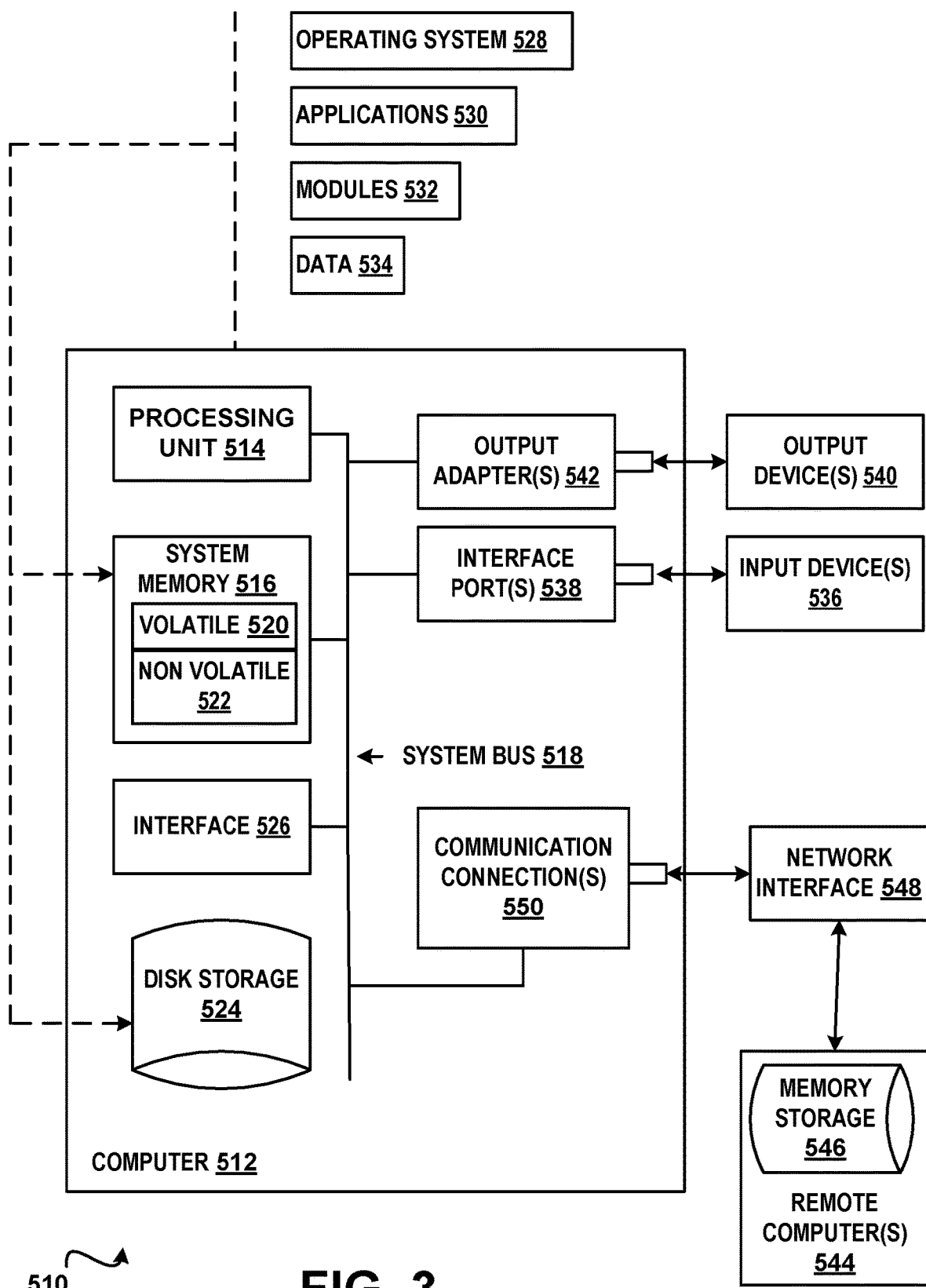
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
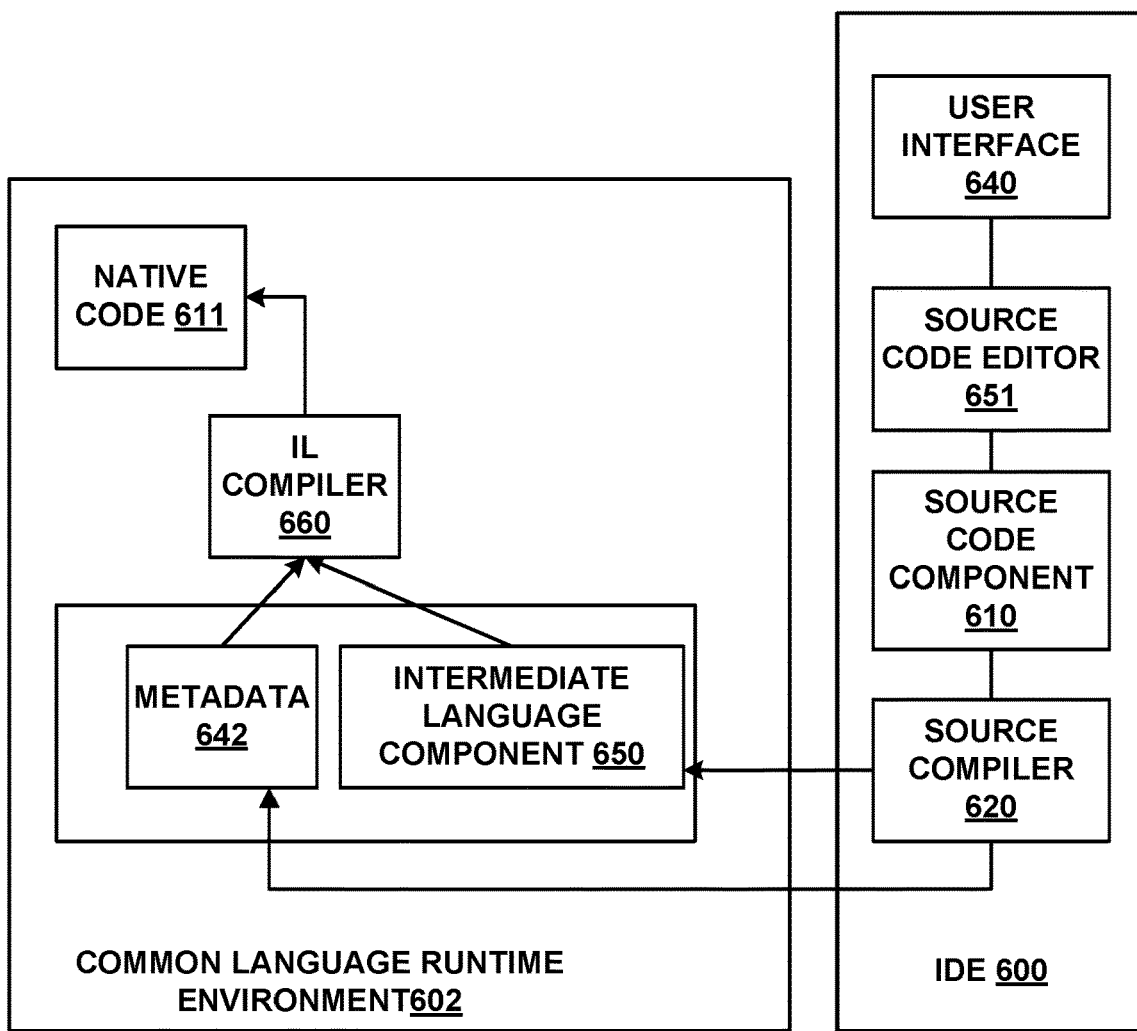
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
at least one processor:
   a memory connected to the at least one processor; and
   the at least one processor configured to maintain compatibility between program code compiled with a first version of a shared library and executed with a second version of the shared library by generating a dictionary for the program code by:
   scanning program code during compilation to determine an order for a fixed portion of a first version of the dictionary for the program code, wherein offsets for entries in the fixed portion of the first version of the dictionary do not change from compilation to compilation of the program code;
   during compilation of the program code inserting into the compiled program code a placeholder for an entry in a floating portion of the first version of the dictionary, wherein a layout of the floating portion of the first version of the dictionary varies from compilation to compilation of the program code;
   replacing the placeholder in the compiled program code with a value for an index for the entry in the floating portion of the first version of the dictionary; and
   assigning a version number to the first version of the dictionary, the first version of the dictionary associated with the first version of the shared library, so that during execution of the program code, in response to determining that the first version of the shared library is incompatible with the second version of the shared library, the floating portion of the first version of the dictionary is dynamically re-created during execution of the compiled program code and the version number assigned to the first version of the dictionary is updated.

2. The computing device of claim 1, the at least one processor further configured to:
   create a list of dependencies based on the program code.

3. The computing device of claim 2, the at least one processor further configured to:
   sort the list of dependencies to generate the order for the fixed portion of the dictionary.

4. The computing device of claim 1, wherein the program code comprises shared generic code.

5. A method of maintaining compatibility between program code compiled with a first version of a shared library and executed with a second version of the shared library comprising:

generating a dictionary for the program code by:
  scanning program code during compilation to determine an order for a fixed portion of a first version of the dictionary for the program code, wherein offsets for entries in the fixed portion of the first version of the dictionary do not change from compilation to compilation of the program code;
  during compilation of the program code inserting into the compiled program code a placeholder for an entry in a floating portion of the first version of the dictionary, wherein a layout of the floating portion of the first version of the dictionary varies from compilation to compilation of the program code;
  replacing the placeholder in the compiled program code with a value for an index for the entry in the floating portion of the first version of the dictionary; and
  assigning a version number to the first version of the dictionary, the first version of the dictionary associated with the first version of the shared library, so that during execution of the program code, in response to determining that the first version of the shared library is incompatible with the second version of the shared library, the floating portion of the first version of the dictionary is dynamically re-created during execution of the compiled program code and the version number assigned to the first version of the dictionary is updated.

6. The method of claim 5, wherein the program code comprises shared generic code.

7. The method of claim 5, further comprising:
creating a list of dependencies based on the program code.

8. The method of claim 7, further comprising:
sorting the list of dependencies.

9. The method of claim 8, further comprising:
ordering the entries in the fixed part of the dictionary by the sorted list.

10. A machine-readable storage medium storing machine-readable instructions that when executed cause a computer to:
  maintain compatibility between program code compiled with a first version of a shared library and executed with a second version of the shared library by generating a dictionary for the program code by:
  scanning program code during compilation to determine an order for a fixed portion of a first version of the dictionary for the program code, wherein offsets for entries in the fixed portion of the first version of the dictionary do not change from compilation to compilation of the program code;
  during compilation of the program code inserting into the compiled program code a placeholder for an entry in a floating portion of the first version of the dictionary, wherein a layout of the floating portion of the first version of the dictionary varies from compilation to compilation of the program code;
  replacing the placeholder in the compiled program code with a value for an index for the entry in the floating portion of the first version of the dictionary; and
  assigning a version number to the first version of the dictionary, the first version of the dictionary associated with the first version of the shared library, so that during execution of the program code, in response to determining that the first version of the shared library is incompatible with the second version of the shared library, the floating portion of the first version of the dictionary is dynamically re-created during execution of the compiled program code and the version number assigned to the first version of the dictionary is updated.

11. The machine-readable storage medium of claim 10, the program code comprising shared generic code.

12. The machine-readable storage medium of claim 10 storing further machine-readable instructions that when executed cause the computer to:
  create a list of dependencies based on the program code.

13. The machine-readable storage medium of claim 12 storing further machine-readable instructions that when executed cause the computer to:
  sort the list of dependencies to generate the order for the fixed portion of the dictionary.

* * * * *